(12) United States Patent
Vancil

(10) Patent No.: US 8,957,573 B2
(45) Date of Patent: Feb. 17, 2015

(54) MINIATURE WIRE MOUNT CATHODE WITH MODULATING ELECTRODE

(76) Inventor: Bernard K Vancil, Beaverton, OR (US)

( * ) Notice: Subject to any disclaimer, the term of this patent is extended or adjusted under 35 U.S.C. 154(b) by 0 days.

(21) Appl. No.: 13/092,526

(22) Filed: Apr. 22, 2011

(65) Prior Publication Data

US 2011/0284261 A1    Nov. 24, 2011

Related U.S. Application Data

(60) Provisional application No. 61/327,047, filed on Apr. 22, 2010.

(51) Int. Cl.
  *H01J 9/02*    (2006.01)
  *H01J 1/00*    (2006.01)
  *H01J 1/02*    (2006.01)
  *B23K 15/00*   (2006.01)
  *B23K 26/32*   (2014.01)

(52) U.S. Cl.
  CPC ......... *B23K 15/0006* (2013.01); *B23K 15/0093* (2013.01); *B23K 26/322* (2013.01); *B23K 2201/20* (2013.01); *B23K 2201/38* (2013.01)
  USPC ............................ 313/310; 313/309; 313/311

(58) Field of Classification Search
  None
  See application file for complete search history.

(56) References Cited

U.S. PATENT DOCUMENTS 8,058,789 B2 * 11/2011 Hunt et al. .................. 313/396
2008/0185953 A1 * 8/2008 Hunt et al. .................. 313/414

* cited by examiner

*Primary Examiner* — Natalie Walford
(74) *Attorney, Agent, or Firm* — patenttm.us

(57) ABSTRACT

Wire-suspended thermionic cathodes provide lower power, further reduction in size, better stability and accuracy, and higher loading then conventional art. The cathodes are too small for use with conventional heaters and so are heated from behind by an electron beam or an intense light beam, such as laser light transmitted via optical fiber to the back of the cathode. The cathodes are electrically isolated from the focus electrode, thus allowing beam cutoff and modulation.

24 Claims, 5 Drawing Sheets

CATHODE ASSEMBLY
SIDE VIEW 10

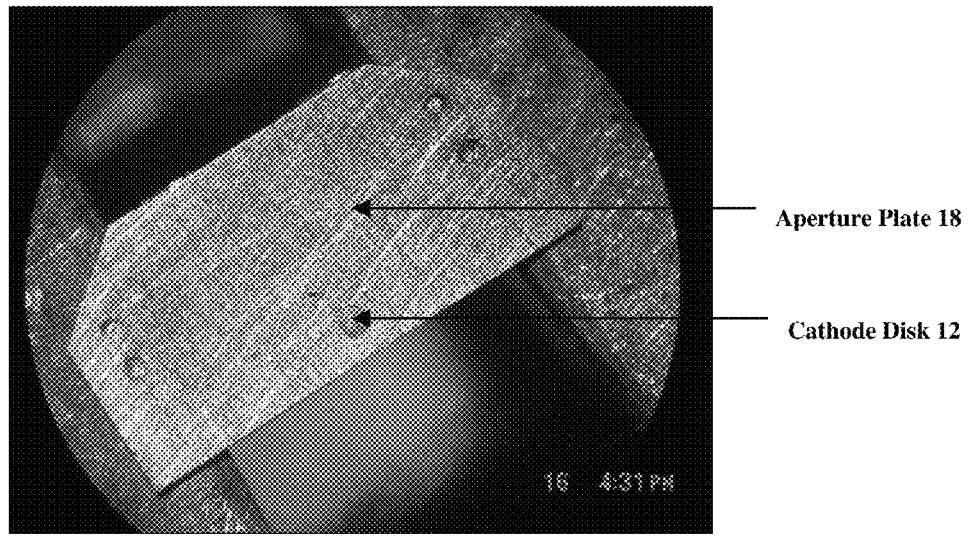
Figure 3. Photograph of front view of cathode inside aperture plate

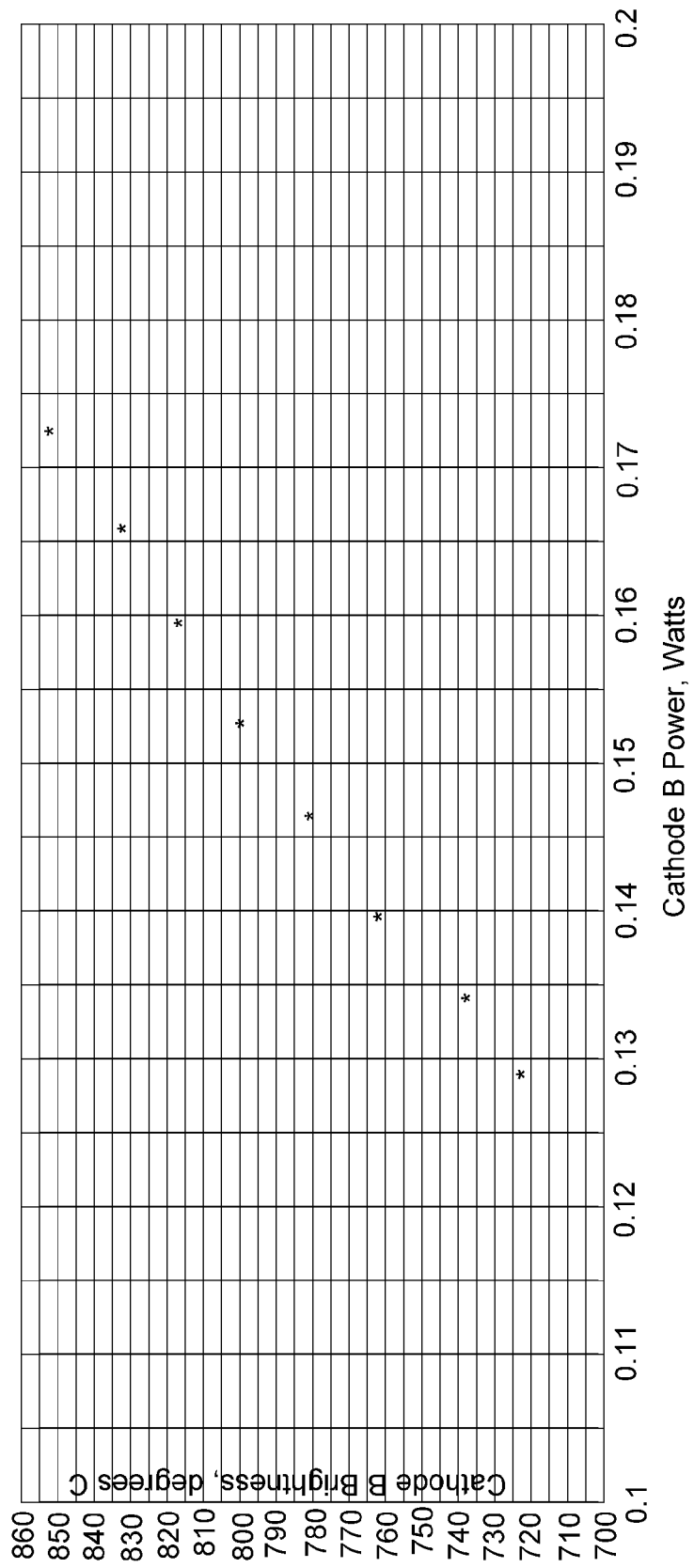

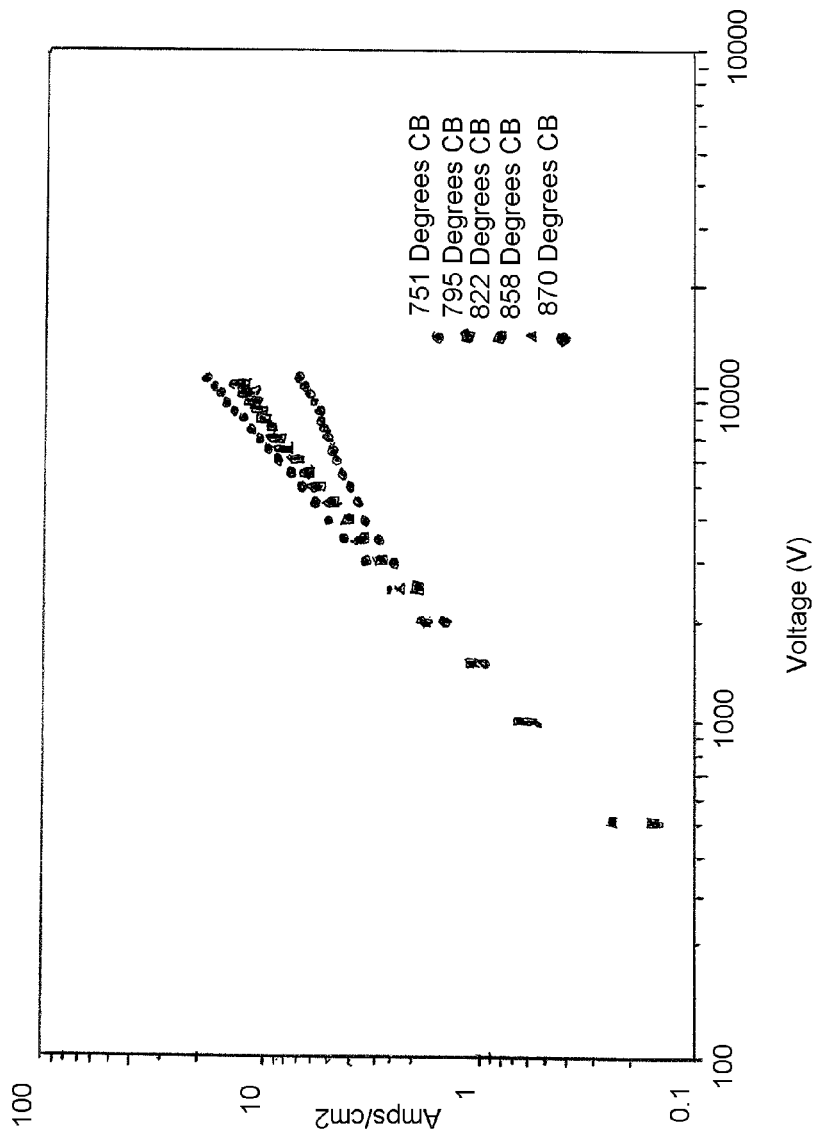
FIG 5. Emission Test Result

MINIATURE WIRE MOUNT CATHODE WITH MODULATING ELECTRODE

BACKGROUND OF THE INVENTION

This invention relates to thermionic cathode technology and more particularly to miniature cathodes for use in very high frequency linear beam amplifiers.

Generating small, intense electron beams and injecting them into the interaction region of terahertz vacuum electron devices such as backward wave oscillators or traveling wave tubes presents many problems. In very high frequency applications, the beam within the interaction regions of the device needs to be very small, given the small size of these devices. Conventional beam sizes are 0.020 inch to 0.100 inch diameter, which is too large.

SUMMARY OF THE INVENTION

In accordance with the invention, a thermionic cathode is mounted by use of wires to allow precise mounting of very small cathodes inside a focus electrode.

Accordingly, it is an object of the present invention to provide an improved miniature cathode.

It is a further object of the present invention to provide an improved miniature wire-strung cathode for high frequency vacuum electron devices.

It is yet another object of the present invention to provide an improved method for construction of cathodes.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3 is an emission side view of a cathode assembly;
FIG. 4 is a graph of cathode temperature vs. power;
and
FIG. 5 is a graph of a family of emission current vs. anode voltage curves in log-log format.

DETAILED DESCRIPTION

The system, according to a preferred embodiment of the present invention, comprises a cathode disk held in place by tensioned wires which are mounted on an insulator plate which is, in turn, brazed and welded to an aperture plate which contains an aperture which surrounds the cathode.

Figure 1:
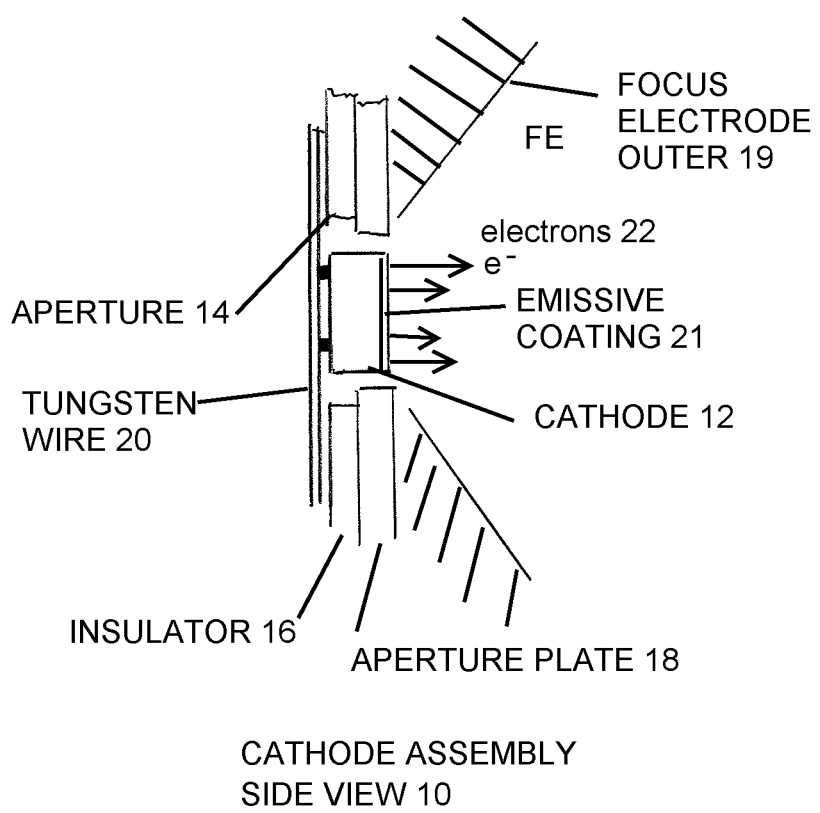
FIG. 1 is a cross section side view of a wire mount cathode.

Referring to FIG. 1, a cross section side view of a wire mount cathode assembly 10, a cathode disk 12 is positioned within an aperture 14 of aperture plate 18 which is brazed to insulator 16 and welded to focus electrode 19. Tensioned wires 20 are fastened to the back face of cathode disk 12 and to the insulator 16. Wires 20 maintain the cathode in position within aperture 14 and in alignment to the focus electrode 19, and also provide thermal isolation between the cathode disk, which must reach a temperature up to 1000° C., and the surrounding structure. The cathode in the preferred embodiment is made of nickel and has an emissive coating 21 of barium-strontium-calcium oxide on its right surface. On heating of the cathode (heating methods are discussed hereinbelow) and under the impetus of an electric field, electrons 22 are emitted by the cathode 12 and are focused by the focus electrode 22 to form an electron beam.

Figure 2:
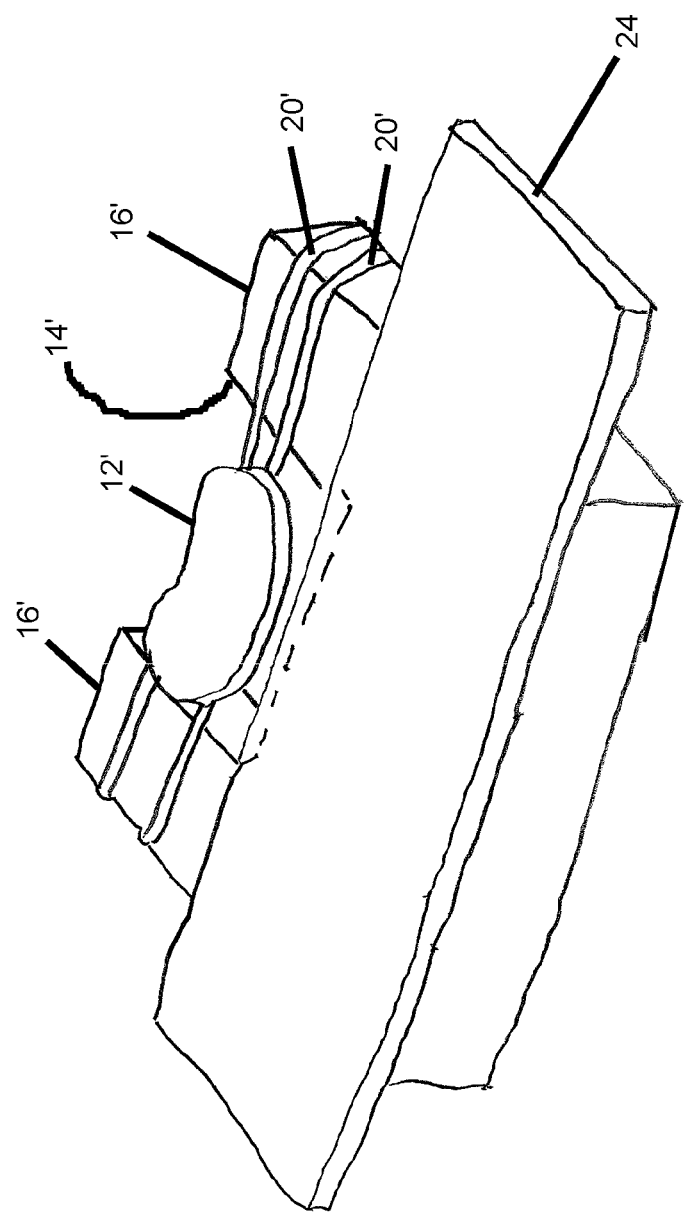
FIG. 2 is a front side perspective view of a particular wire mount cathode.

Referring now to FIG. 2, a front side (emission side) perspective view of a particular wire mount cathode in accordance with FIG. 1 is shown. The relationship between cathode 12' and wires 20', insulator 16', aperture plate 18' and focus electrode 19' can be observed with explanation of a particular manufacturing procedure. A plate 24 is provided, suitably of Kovar (brand of Carpenter Technology Corporation of Reading, Pa.) or other nickel-cobalt ferrous alloy metal (designed to be compatible with the thermal expansion characteristics of the insulator in order to allow brazing and operation over a range of temperatures), attached to the insulator 16', which suitably comprises a ceramic or alumina plate having opening 14' formed therein. The aperture plate and focus electrodes (not shown in FIG. 2) are then attached by welding to the plate 24. The ceramic plate has opening 14' formed therein that the cathode disk 12' sits in, enabling the alignment of the cathode to the focus electrodes to be observed from behind the cathode. From observation of FIGS. 1 and 2, it may be noted that the aperture is only slightly larger than the size of the cathode (the cathode is approximately 76% the diameter of the aperture in FIG. 1, 72% of the aperture in the view of FIG. 2.

Cathode 12, 12' suitably comprises a standard nickel cathode, 0.003 inch thick, with an oxide coating on the emission surface, but can also comprise an impregnated dispenser cathode.

The wire mounting of the cathode allows precise mounting of the cathode, which can be of very small size, inside a focus electrode. The cathode has virtually no transverse movement relative to the focus electrode as the cathode is heated and cooled. The mounting system prevents the cathode from moving forward relative to the focus electrode as it heats up, providing stability in all directions. The cathode is electrically isolated from focus electrode, allowing beam modulation and cutoff by applying negative voltage or bias to focus electrode relative to cathode.

Wires 20, 20' are tensioned, suitably comprising no-sag tungsten wire, two such wires being used in a particular embodiment, provided mounting to the back surface of cathode 12', tensioned in a plane parallel to the plane of the cathode.

FIG. 3 is a view of the emitting side of a cathode assembly, with a circular cathode 12 concentrically located inside the aperture plate 18.

Heating of the cathode is accomplished by different methods. Because the cathode is mounted such that it is open at the back, an electron beam or laser, for example, can be used to heat the cathode.

EXAMPLES

A cathode was constructed consisting of a barium oxide-coated nickel disk, 0.33 mm (0.0135 inch) diameter and about 0.07 mm thick. The cathode was suspended in an aperture plate by two tensioned tungsten wires to which the cathode was welded. The tensioned wires offer excellent mechanical and thermal stability.

The cathode was tested to 11 $A/cm^2$ emission in pulsed operation.

Remote Heating with Light

A 250 mw diode laser is sufficient to heat the cathode. Light from the diode laser is transmitted through a multimode fiber which is about 0.25 mm diameter. The fiber end is placed in close proximity to the back of the cathode. The fiber should be vacuum compatible, with core and cladding capable of standing tube bake-out temperatures of 400° C. Aluminum-coated silicon dioxide fiber works in this capacity. The optical fiber must pass hermetically through the vacuum envelope of the tube in which the cathode is mounted. The laser diode is coupled via suitable optics to the fiber optic cable. While laser diodes are inefficient generators of light, coherence and small emission angle means that, coupled to fiber optics, overall transmission is higher than with conventional sources such as LEDs. Also, multi-mode fibers are less efficient than single mode, but less than 10% was lost in an experiment with a four-inch piece, which is longer than is needed for this application.

High efficiency LEDs (light emitting diodes) were investigated. The large angular dispersion of these sources prevents efficient use with optical fibers, which typically have acceptance angles of less than 22 degrees. However, with sufficient power, LEDs or more conventional sources constitute an alternative embodiment.

Power Consumption

FIG. 4 shows cathode power dissipation vs. cathode temperature. At 800° C. (Brightness) the dissipation is only 153 milliwatts. Because this curve is nearly linear with temperature, it indicates that most of the losses are through conduction along the tungsten wires. For 50 $A/cm^2$ emission, the cathode temperature must go to 950° CB. Including contribution due to radiation, dissipation is expected to increase to ~250 mw at 950° CB based on extrapolation of the example measurements.

Emission

Oxide cathodes operate at the lowest temperature of all thermionic emitters. They can easily attain 1 $A/cm^2$ at under 750° CB. A drawback is that their coating forms a resistive barrier at emission levels above 1 $A/cm^2$. Much higher emissions are possible in pulsed operation, but average emission must stay in the vicinity of 1 $A/cm^2$.

A family of emission current vs. anode voltage curves in log-log format is shown in FIG. 5. Temperature is indicated as a parameter. This data is consistent with observed pulsed emission of 50 $A/cm^2$ at about 925° CB.

Mechanical Stability

Tests were performed on cathodes in situ under a microscope at 100 power. Tests included stability under thermal excursion, and stability under thermal cycling. Rapid heating of cathodes to 900° C. revealed no visible movement. Also, no discernible displacement was observed after 500 thermal cycles ranging between 20° C. and 800° C.

Further Remote Heating Embodiments

Laser heating to improve efficiency and lower complexity may be employed, as well as LED injection into fiber optics. Large fibers (>1 mm) can capture more of the LED light, with inclusion of a lens on the output to focus the light on the much smaller cathode. An area compression ratio of 16 to 1 would be employed for the current device. LEDs offer a low-cost alternative to lasers.

Smaller Cathodes

The technology of wire-suspended cathodes is scalable down to sizes under 0.12 mm. A cathode this size at 50 $A/cm^2$ would produce 6 ma of current. At 6000 volts, the power in the electron beam would be 38 watts. A beam with this power at 200 $A/cm^2$ is only 0.0024 inches in diameter. This is small enough for terahertz frequency devices. Beam area compression from cathode to beam is only 4 to 1.

Alternative Cathodes

Oxide cathodes operate at high loading, low temperature, but low duty. Devices to run at full duty and still have high loading at low temperature include dispenser cathodes. Some osmium-coated cathodes are able to produce 5 $A/cm^2$ at only 900° CB. Scandate cathodes have been observed emitting at this level at even lower temperatures. Incorporating dispenser cathodes into this structure employs small, thin matrices with tungsten wires welded to them.

Accordingly, the cathode as shown and described offers a solution to the problem of generating small, intense electron beams and injecting them into the interaction region of terahertz vacuum electron devices such as backward wave oscillators or traveling wave tubes.

Advantages provided by the cathode include:

1) Close coupling of cathode to focus electrode and in the same plane. This improves positional accuracy and stability within the focus electrode.

2) Viewability from the rear. This allows the cathode to be precisely positioned relative to larger structures as well as allowing remote heating from the back with an electron beam or laser.

3) Remote heating. By eliminating a conventional heater, cathode mass and size are drastically reduced, and mechanical stability improved. Now only the electron-emitting portion of cathode resides in the aperture of the focus electrode.

4) Electrical isolation between cathode and focus electrode. This allows modulation and cutoff of the electron beam with only small voltage swings (100 volts or less). The very low capacitance (<5 picofarads) allows modulation frequencies to 500 MHz.

5) Good thermal isolation of cathodes allows heating with diode lasers and even LEDs in conjunction with optical fiber.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A cathode comprising:
    a cathode disk;
    an aperture, wherein said cathode disk is positioned within said aperture by a tensioned support member mounting the cathode disk,
    further comprising a heating source comprising a laser.

2. The cathode according to claim 1, wherein said aperture is formed in an aperture plate, said aperture is slightly larger diameter than said cathode disk.

3. The cathode according to claim 1, wherein said tensioned support member comprises one or more tensioned wires mounting the cathode disk, said one or more tensioned wires being co-planar along portions of said one or more wires that are not in contact with the cathode disk, with a face of the cathode disk to which said one or more tensioned wires mount to the cathode disk.

4. The cathode according to claim 3, further comprising an insulator, wherein said one or more tensioned wires are mounted on said insulator, thus allowing different voltages to be applied to the cathode disk and aperture, allowing an electron beam emitted by the cathode to be modulated or pulsed at a high frequency by application of the voltages between the cathode disk and aperture.

5. The cathode according to claim 4, wherein said aperture is formed in an aperture plate and said insulator is fastened to said aperture plate.

6. The cathode according to claim 5, wherein said insulator defines an opening at a portion thereof to expose a heating side of said cathode disk.

7. The cathode according to claim 5, wherein said insulator and aperture plate are fastened by brazing.

8. The cathode according to claim 1, wherein said cathode is for operation in tetrahertz frequency ranges.

9. The cathode according to claim 1, wherein said cathode allows for high frequency modulation.

10. The cathode according to claim 1, wherein said cathode disk is under 0.12 mm diameter.

11. The cathode according to claim 1, wherein said cathode disk is 0.33 mm diameter or less.

12. The cathode according to claim 1, wherein said tensioned support member comprises tungsten wires.

13. The cathode according to claim 1, wherein said cathode disk is comprised of nickel.

14. The cathode according to claim 1, wherein said cathode disk has an emissive surface of barium-strontium-calcium oxide.

15. The cathode according to claim 1, wherein said cathode disk is non-circular shaped.

16. The cathode according to claim 1, wherein said cathode disk is circular shaped.

17. The cathode according to claim 1, further comprising an optical fiber delivering light from said laser to said cathode disk.

18. A cathode comprising:
a cathode disk;
an aperture, wherein said cathode disk is positioned within said aperture by a tensioned support member mounting the cathode disk,
further comprising a heating source comprising a LED.

19. The cathode according to claim 18, further comprising an optical fiber delivering light from said LED to said cathode disk.

20. The cathode according to claim 18, wherein said tensioned support member comprises one or more tensioned wires mounting the cathode disk, said one or more tensioned wires being co-planar along portions of said one or more wires that are not in contact with the cathode disk, with a face of the cathode disk to which said one or more tensioned wires mount to the cathode disk.

21. The cathode according to claim 20, further comprising an insulator, wherein said one or more tensioned wires are mounted on said insulator, thus allowing different voltages to be applied to the cathode disk and aperture, allowing an electron beam emitted by the cathode to be modulated or pulsed at a high frequency by application of the voltages between the cathode disk and aperture.

22. The cathode according to claim 21, wherein said aperture is formed in an aperture plate and said insulator is fastened to said aperture plate.

23. The cathode according to claim 22, wherein said insulator defines an opening at a portion thereof to expose a heating side of said cathode disk.

24. The cathode according to claim 18, wherein said cathode disk is 0.33 mm diameter or less.

* * * * *